(12) United States Patent
Crockett et al.

(10) Patent No.: US 7,099,441 B2
(45) Date of Patent: Aug. 29, 2006

(54) METHOD AND SYSTEM FOR PROVIDING ENHANCED CALL WAITING WITH VERIFICATION AND NAME CHANGE SERVICE

(75) Inventors: Susanne Marie Crockett, Buffalo Grove, IL (US); Thomas Joseph McBlain, Arlington Heights, IL (US); Mary Louise Hardzinski, Palatine, IL (US); Robert Wesley Bossemeyer, Jr., St. Charles, IL (US)

(73) Assignee: SBC Properties, L.P., Reno, NV (US)

( * ) Notice: Subject to any disclaimer, the term of this patent is extended or adjusted under 35 U.S.C. 154(b) by 43 days.

(21) Appl. No.: 10/870,321

(22) Filed: Jun. 17, 2004

(65) Prior Publication Data

US 2005/0013420 A1    Jan. 20, 2005

Related U.S. Application Data

(63) Continuation of application No. 09/900,938, filed on Jul. 9, 2001, now Pat. No. 6,775,357, which is a continuation of application No. 09/303,157, filed on Apr. 30, 1999, now Pat. No. 6,278,771, which is a continuation-in-part of application No. 09/044,574, filed on Mar. 19, 1998, now Pat. No. 6,219,414.

(51) Int. Cl.
*H04M 1/64* (2006.01)
*H04M 11/00* (2006.01)
*H04M 3/42* (2006.01)
*H04M 7/00* (2006.01)

(52) U.S. Cl. ............... 379/88.02; 379/88.01; 379/88.21; 379/93.03; 379/93.35

(58) Field of Classification Search ............ 379/88.01, 379/88.02, 88.11, 88.12, 88.13, 88.2, 88.21, 379/93.03, 93.23, 93.35, 215.01
See application file for complete search history.

(56) References Cited

U.S. PATENT DOCUMENTS

| | | | | |
|---|---|---|---|---|
| 4,618,984 | A | * | 10/1986 | Das et al. .................... 704/244 |
| 5,007,076 | A | * | 4/1991 | Blakley .................... 379/88.21 |
| 5,309,512 | A | * | 5/1994 | Blackmon et al. ...... 379/215.01 |
| 5,421,731 | A | * | 6/1995 | Walker ....................... 434/167 |
| 5,511,111 | A | * | 4/1996 | Serbetcioglu et al. .... 379/88.01 |
| 5,717,741 | A | * | 2/1998 | Yue et al. ................. 379/88.12 |
| 5,724,481 | A | * | 3/1998 | Garberg et al. ............. 704/243 |
| 5,796,806 | A | * | 8/1998 | Birckbichler .............. 379/88.2 |
| 5,848,142 | A | * | 12/1998 | Yaker ..................... 379/215.01 |
| 6,055,498 | A | * | 4/2000 | Neumeyer et al. .......... 704/246 |
| 6,073,101 | A | * | 6/2000 | Maes ......................... 704/275 |
| 6,278,771 | B1 | * | 8/2001 | Crockett et al. ......... 379/88.02 |

\* cited by examiner

*Primary Examiner*—Bing Q. Bui
(74) *Attorney, Agent, or Firm*—Brinks Hofer Gilson & Lione

(57) ABSTRACT

A method and apparatus for verifying call waiting information in a communication system is particularly well suited for correcting mispronunciation of caller identification information provided for a call waiting call. A current pronunciation of the call waiting information is provided to the calling party who is prompted to change the current pronunciation. The system receives a new pronunciation of the call waiting information and stores information about the new pronunciation for subsequent retrieval.

11 Claims, 9 Drawing Sheets

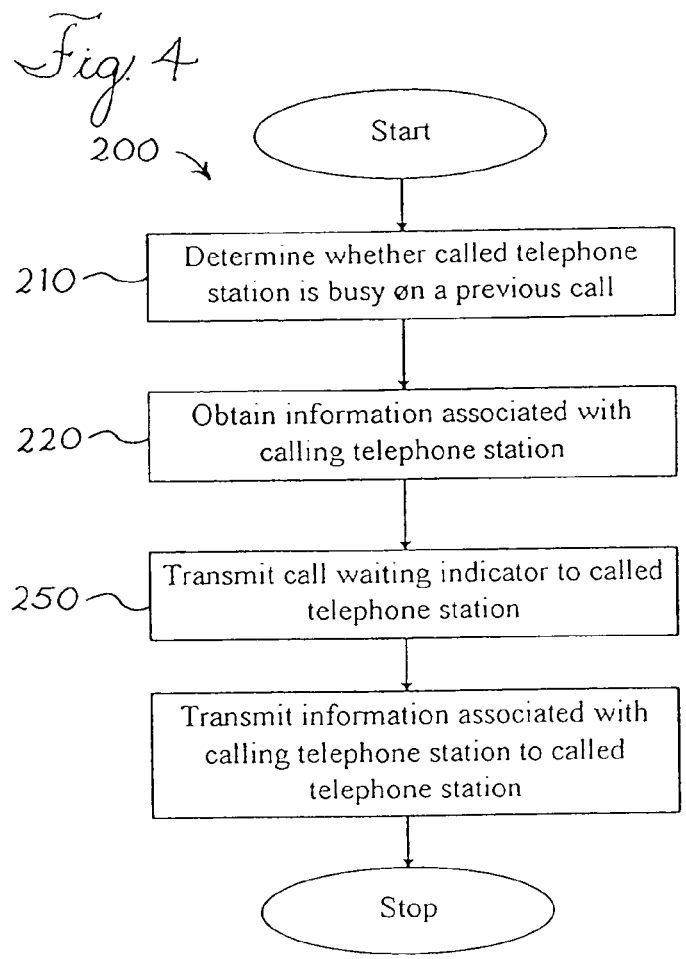
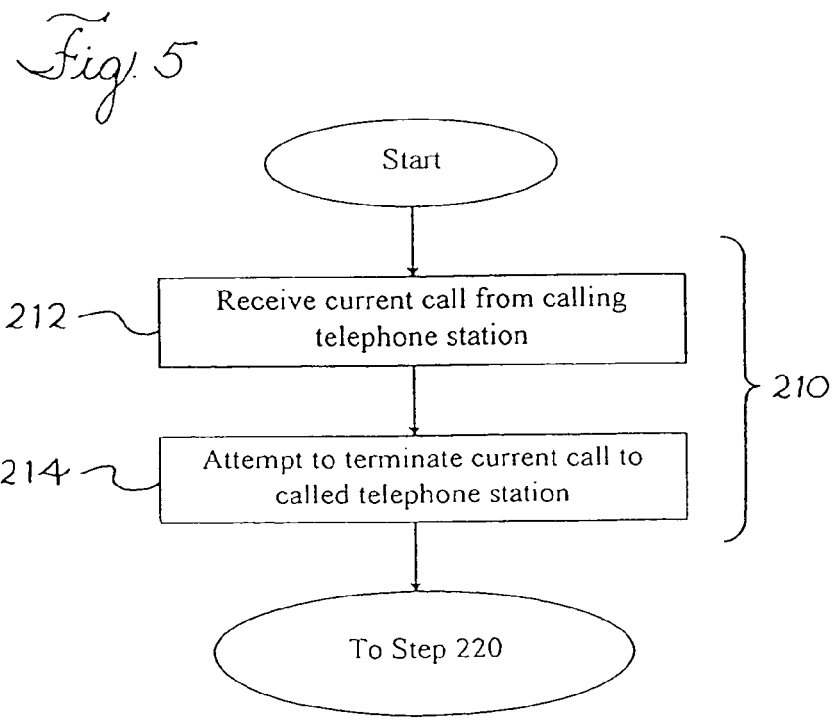

METHOD AND SYSTEM FOR PROVIDING ENHANCED CALL WAITING WITH VERIFICATION AND NAME CHANGE SERVICE

RELATED APPLICATIONS

The present patent document is a continuation of U.S. application Ser. No. 09/900,938, filed Jul. 9, 2001, now U.S. Pat. No. 6,775,357, which is a continuation of application Ser. No. 09/303,157, filed Apr. 30, 1999, now U.S. Pat. No. 6,278,771, which is a continuation-in-part of application Ser. No. 09/044,574, filed Mar. 19, 1998, now U.S. Pat. No. 6,219,414. All of the foregoing applications are hereby incorporated by reference.

BACKGROUND

The present invention relates generally to telecommunications call processing and more particularly to call waiting service features.

Call waiting services are offered by numerous service providers and are well known by those skilled in the art. Call waiting services generally notify a customer that is busy on a previous call that a current call has been placed to the customer. Call waiting services commonly utilize an audible tone that is transmitted to the customer, to notify the customer that the current call is waiting. When the customer is notified that the current call is waiting, the customer can decide whether or not to suspend the previous call to take the current call. Accordingly, information about the current call aids in the customer's decision. U.S. Pat. No. 4,899,358 describes a system that provides an audible representation of the calling party's name to notify a customer that a call is waiting. This system substitutes the name in place of the tone commonly used to notify the customer. While substitution of the name in place of the tone provides the customer with additional information, delivering information in this format can result in confusion for the customer. For example, providing just the name of a caller can be confusing when the name is interjected in the middle of a conversation without warning.

Other systems provide additional information to the customer in varying formats. U.S. Pat. No. 5,309,512 describes a system that first provides a tone to indicate that a current call is waiting and then waits for a command from the customer. This system only provides the name of the calling party after receiving the command. To provide the required command, the customer completes a flash hook at his telephone station. The flash hook puts the previous caller on hold for a significant amount of time while the customer hears the name of the current caller and then decides whether or not to take the current call. Providing information in this format also creates additional problems for the customer. For example, the customer is not immediately provided with the information necessary to decide whether or not to take the current call. This results in an inconvenience for the both the previous caller and the customer, especially if the customer ultimately decides not to take the current call and returns to the previous call after a significant delay in the call.

U.S. patent application Ser. No. 09/044,574 was filed Mar. 19, 1998 and commonly assigned with the present application is hereby incorporated herein by reference. This application discloses a method and system in which a call waiting message includes a call waiting indicator and an audible representation of information associated with a current calling party. The call waiting message alerts the customer that a current call is waiting and provides the customer with information that assists the customer in deciding whether or not to take the current call. The call waiting indicator and the information associated with the current calling party are automatically transmitted to the customer without any customer commands. The associated information is voiced to the customer using a text to speech function.

While this disclosed system is very effective at providing the call waiting message, some caller names are difficult to accurately render audibly using the text to speech capability. These names include names having non-standard pronunciations, some foreign names and other names that may be misinterpreted by the text to speech logic as enforced by parsing rules. This misinterpretation of the calling party's name can be embarrassing to the calling party and it limits the utility of the call waiting system if the called party can not reliably determine the caller's identity.

BRIEF DESCRIPTION OF THE DRAWINGS

FIG. 4 is a flow chart of a method for processing a telephone call of a preferred embodiment.

FIG. 5 is a more detailed flow chart of the method depicted in FIG. 4.

DETAILED DESCRIPTION OF THE PRESENTLY PREFERRED EMBODIMENTS

Figure 1:
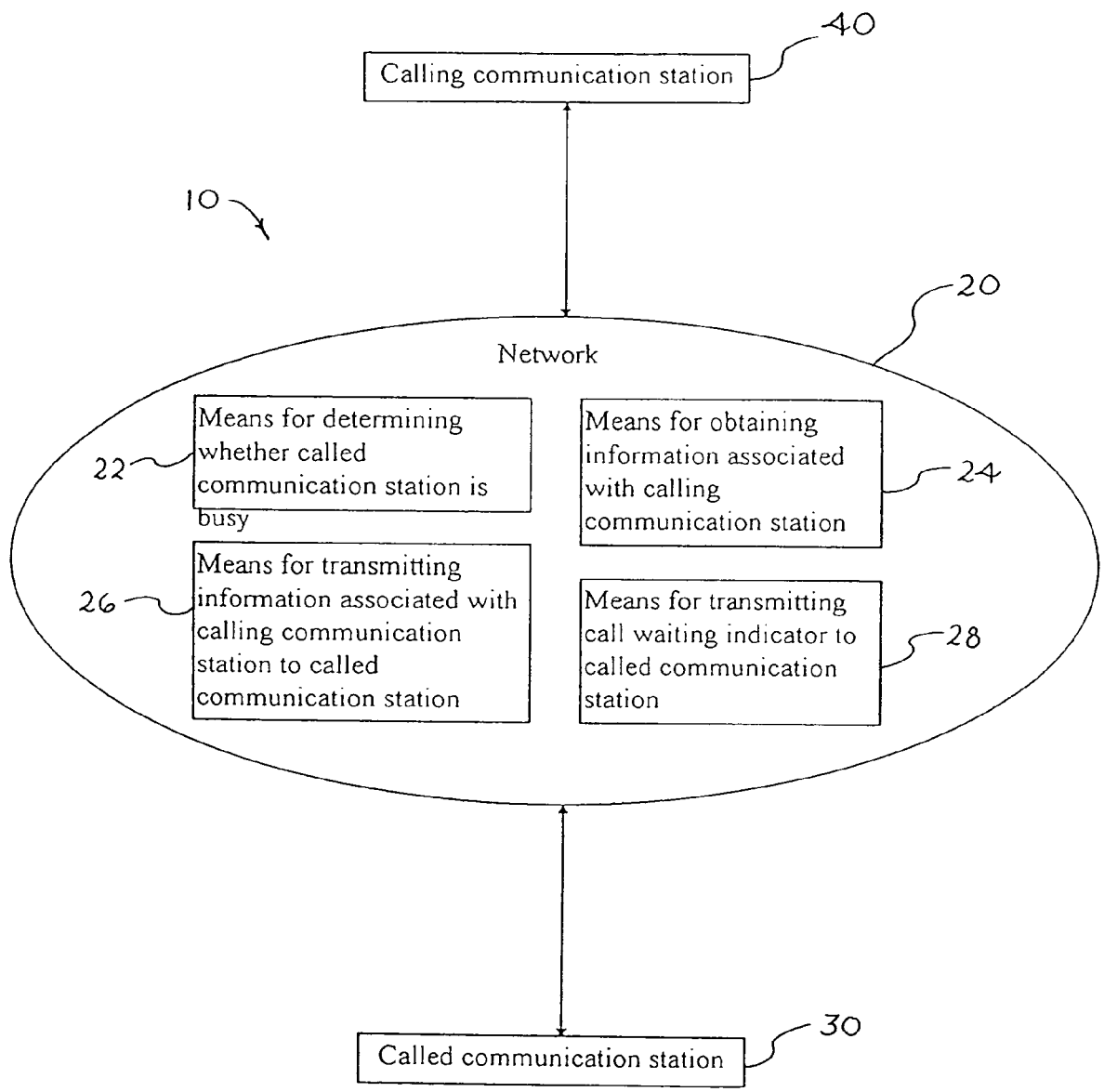
FIG. 1 is a block diagram of a system for processing a telephone call of a preferred embodiment.

By way of example, FIG. 1 depicts a system 10 of a preferred embodiment. The system 10 comprises a network 20, a called communication station 30 connected with the network 20 and a calling communication station 40 connected with the network 20. The network 20 preferably comprises: means for determining whether the called communication station is busy 22, means for obtaining information associated with the calling communication station 24; means for transmitting the information associated with the calling communication station to the called communication station 26; and means for transmitting a call waiting indicator to the called communication station 28.

The system 10 is preferably implemented in a telecommunications network as known by those skilled in the art. Alternatively, the system 10 can be implemented in computer network or any other network that is adapted to store and retrieve information. Each of the means 22, 24, 26, 28 described above is preferably implemented through the use of computer readable program code written in any suitable programming language and implemented on an analog or digital computer utilizing any suitable operating system as known by those skilled in the art. Alternatively, each of the means 22, 24, 26, 28 can be implemented through the use of hardware in the form of a hardwired computer, an integrated circuit, or a combination of hardware and computer readable program code as known by those skilled in the art. The calling communication station 40 and the called communication station 30 preferably comprise an analog telephone station as known by those skilled in the art. According to an alternative embodiment, the communication stations 30, 40 can comprise any suitable communication station adapted for use in the present embodiments as known by those skilled in the art.

The system 10 enables a customer at the called communication station 30, who is busy on a previous call, to be efficiently and effectively notified that a current call from calling communication station 40 is waiting. The system 10 provides an enhanced call waiting message that includes both the call waiting indicator and the audible representation of information associated with the calling communication station 40. The call waiting indicator and the audible representation of information associated with the calling communication station can be automatically transmitted to the called communication station 30 prior to any commands from the customer. The combination of the call waiting indicator and the information associated with the calling communication station alerts the customer that the current call is waiting and provides the customer with information that assists the customer in deciding whether to take the current call.

Figure 2:
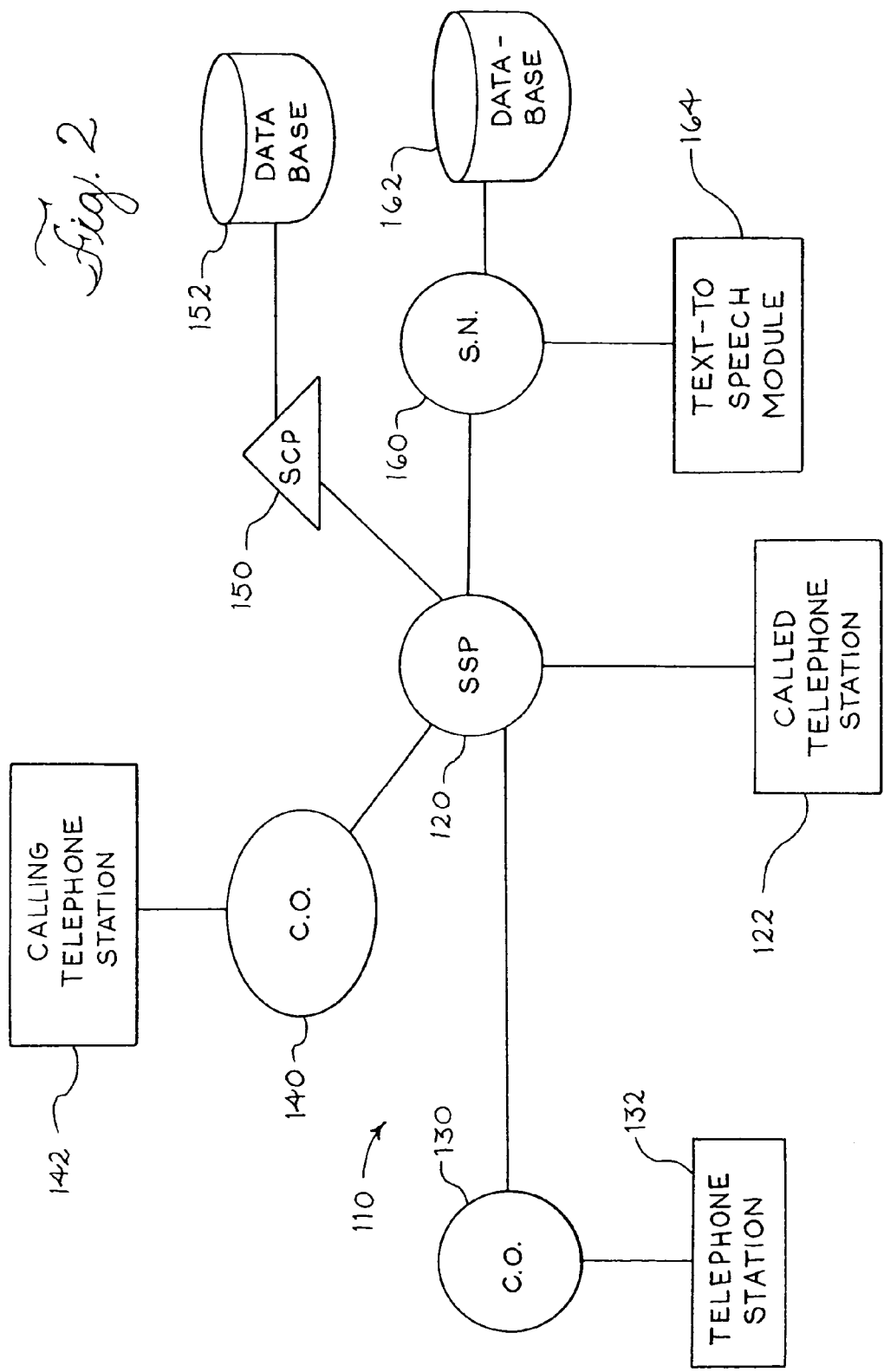
FIG. 2 is more detailed block diagram of the system depicted in FIG. 1.

By way of further example, FIG. 2 depicts a preferred embodiment of the system described above. The system 110 comprises a service switching point (SSP) 120, a service control point (SCP) 150, an SCP database 152, a service node (SN) 160, a database 162, central offices 130, 140 and telephone stations 122, 132, 142. Intelligent network system components, commonly referred to as advanced intelligent network (AIN) components, suitable for implementing the present embodiment are commercially available from Lucent Technologies and are well know by those skilled in the art. AIN components can implement computer readable program code as known by those skilled in the art. Vendors of AIN components typically have a preferred programming language and operating platform as known by those skilled in the art.

SSP 120 preferably comprises an AIN switch that routes calls, generates queries to SCP 150 to obtain call control information and responds to call control information. SSP 120 connects called telephone station 122 with central offices 130, 140 to enable a customer at called telephone station 122 to place calls to and receive calls from telephone stations 132, 142. SSP 120 preferably communicates with SCP 150, central offices 130, 140, and SN 160 in accordance with a signaling protocol such as Signaling System 7 (SS7) or other such signaling protocols as known by those skilled in the art.

SCP 150 preferably comprises an AIN element that stores call control information in SCP database 152 and accesses the stored call control information. SCP 150 receives queries generated by SSP 120 and preferably responds to the queries by performing database searches to locate the requested call control information. SCP 150 can forward the located call control information to SSP 120. SCP 150 preferably comprises an AIN element as well known by those skilled in the art.

SN 160 preferably comprises a network element that stores call control information and performs call related functions as known by those skilled in the art. SN 160 receives calls forwarded from SSP 120, performs searches or other requested functions and returns information or data to SSP 120. In an alternate embodiment, SN 160 can be configured to produce call waiting indicators as described herein. SN 160 preferably includes a text to speech module 164 that performs text to speech conversions to produce an audible representation of the text. Such modules and conversions are well known by those skilled in the art.

Database 152 preferably comprises a data storage element for use with SCP 150 as well known by those skilled in the art. Database 152 preferably stores call control information that can be implemented by SSP 120 to control calls. Such call control information is well known by those skilled in the art.

Database 162 preferably comprises a caller identification with name database as known by those skilled in the art. Database 162 preferably stores information associated with a telephone number that is associated with calling telephone station 142. The information associated with the telephone number preferably comprises the identity of a caller in the form of the caller's name. Alternatively, the information associated with the telephone number can comprise the identity of a caller in the form of the caller's name and the telephone number for calling telephone station 142. The telephone number preferably comprises a 10 digit telephone number as known by those skilled in the art but can also comprise any type of identification format used to identify telephone stations. Database 162 can alternatively comprise a caller assistance database as known by those skilled in the art. While database 162 is depicted within a telecommunications system, database 162 can comprise any suitable database containing information adapted for use in the present embodiment and is not limited to databases located within a telecommunications network.

Central offices 140, 150 preferably comprise AIN network switches as well known by those skilled in the art. Central offices 140, 150 comprise network switches that connect telephone stations 132, 142 with SSP 120 to enable callers at telephone stations 132, 142 to place calls to and receive calls from the customer at called telephone station 122. Alternatively, central offices 140, 150 can comprise non-AIN network switches as known by those skilled in the art.

Telephone stations 122, 132, 142 preferably comprise analog telephone sets as known by those skilled in the art. Alternatively, telephone stations 122, 132, 142 can comprise wireless, PCN, ISDN or any other form of communication station known by those skilled in the art.

Figure 3:
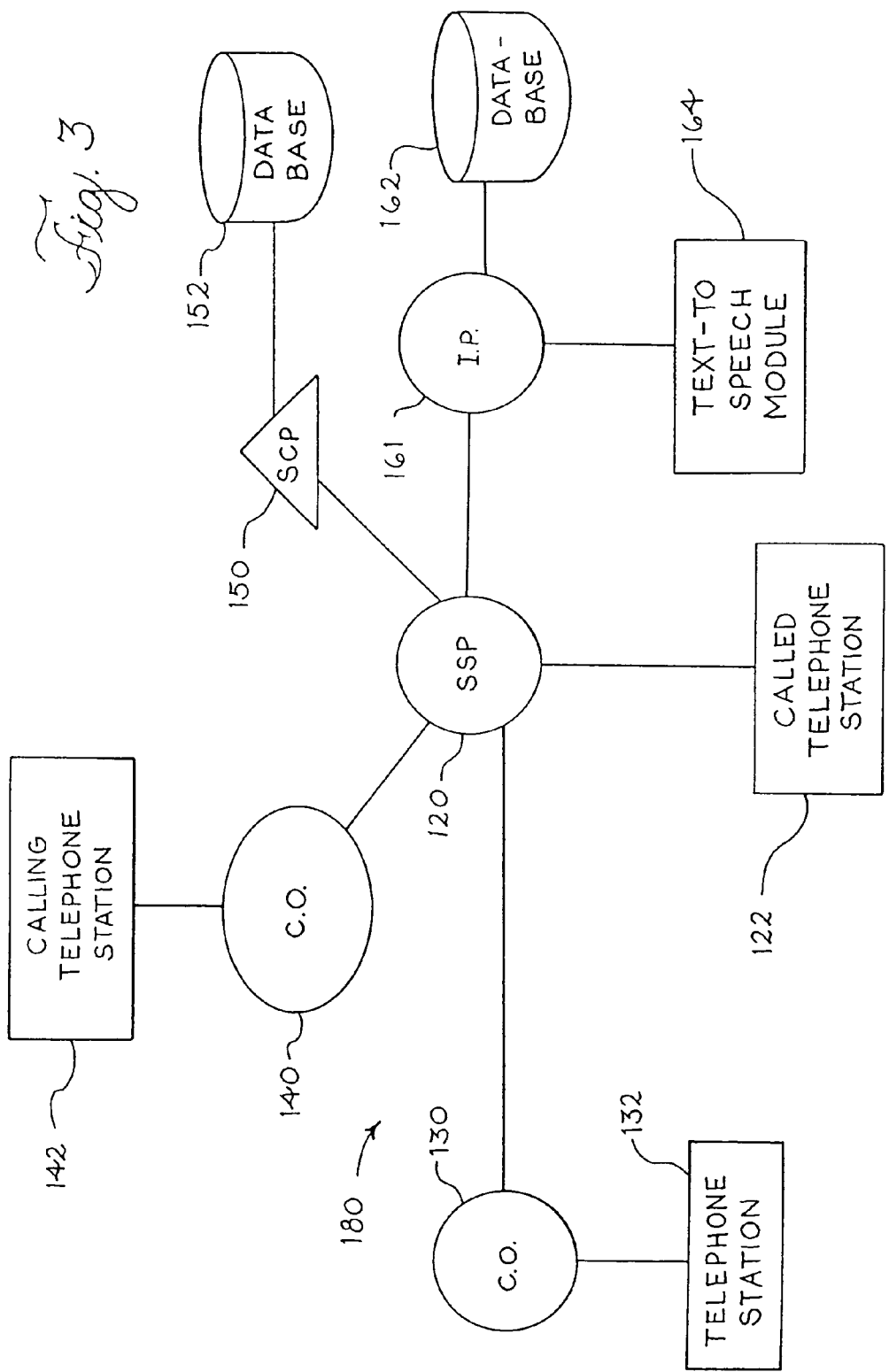
FIG. 3 is an alternate embodiment of the system depicted in FIG. 2.

Referring now to FIG. 3, an alternate embodiment of the system of FIG. 2 is shown. The system 180 comprises: an SSP 120; a called telephone station 122; central offices 130, 140; a telephone station 132; a calling telephone station 142; an SCP 150; an SCP database 152; a database 162; and a text-to-speech module 164 all as described above in reference to FIG. 2. The system also includes an intelligent peripheral (IP) 161 that communicates with SSP 120, database 162 and test-to-speech module 164 and performs the same functions as the SN 160 as described herein. The IP 161 preferably comprises an AIN element that acts on instructions from SCP 120. In an alternate embodiment, IP 161 can be configured to generate call waiting indicators as described herein.

The systems depicted in FIGS. 1, 2 and 3 can be utilized to implement the method 200 depicted in FIG. 4. For purposes of illustration, assume that a customer at called telephone station 122 (FIGS. 2, 3) is on a previous call with a previous calling party at telephone station 132. Connections are established between: telephone station 132 and central office 130; central office 130 and SSP 120; and SSP 120 and called telephone station 122; to enable the previous call to be connected. Also, assume that after the previous call has been commenced, a current calling party at calling telephone station 142 places a current call to the customer at called telephone station 122. In an attempt to connect the current call, central office 140 routes the current call to SSP 120.

The method 200 of processing a current call from a calling telephone station 142 (FIGS. 2, 3) to a called telephone station 122 generally includes the steps of: determining whether the called telephone station is busy on a previous call (step 210, FIG. 4); obtaining information associated with the calling telephone station (step 220); transmitting a call waiting indicator to the called telephone station 122 to signify that the current call is waiting (step 250); and automatically transmitting the information associated with the calling telephone station (step 270) to the called telephone station 122. Each of these steps is discussed in more detail below.

The step of determining whether the called telephone station is busy on a previous call (step 210, FIG. 4), preferably comprises the following steps as depicted in FIG. 5. SSP 120 receives the current call (step 212, FIG. 5) and attempts to terminate the call to called telephone station 122 (step 214). Because the customer at called telephone station 122 is busy on a previous call, the current call cannot be terminated to called telephone station 122 and SSP 120 determines that the customer at called telephone station 122 is busy on a previous call.

Figure 6:
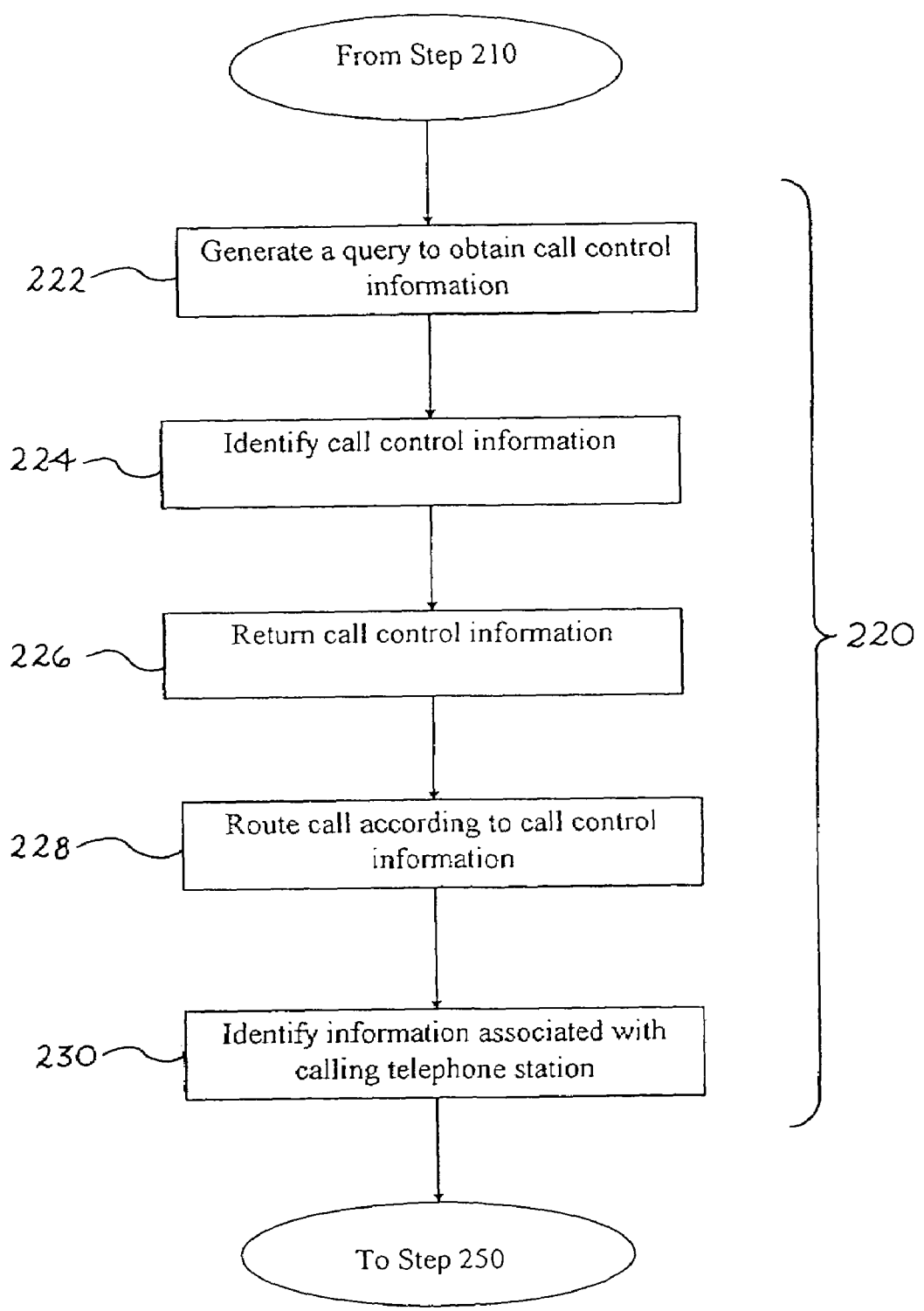
FIG. 6 is a more detailed flow chart of the method depicted in FIG. 4.

The step of obtaining information associated with the calling telephone station (step 220, FIG. 4) preferably comprises the following steps as depicted in FIG. 6. When SSP 120 determines that the customer at called telephone station 122 is busy on a previous call, SSP 120 generates a query to SCP 150 (step 222, FIG. 6) in accordance with a call forward on busy feature, or other similar function, to obtain call control information from SCP 150. Call forward on busy features and other similar functions are well known by those skilled in the art. The call control information instructs SSP 120 where to route the current call when called telephone station 122 is busy. After receiving the query from SSP 120, SCP 150 identifies the relevant call control information (step 224) and forwards it to SSP 120 (step 226). The relevant call control information has been created to enable SSP 120 to forward the current call to SN 160 or IP 161 when called telephone station 122 is busy. In accordance with the call control information, SSP 120 routes the current call to SN 160 or IP 161 (step 228). SN 160 or IP 161 examines the telephone number associated with calling telephone station 142 and identifies information corresponding to the telephone number by performing a database search (step 230). The information corresponding to the telephone number preferably comprises the identity of the current caller at calling telephone station 142 in the form of the name of the current caller. Database 162 preferably comprises a caller identification with name database as known by those skilled in the art. Alternatively, the database 162 can comprise a caller assistance database as known by those skilled in the art.

Figure 7:
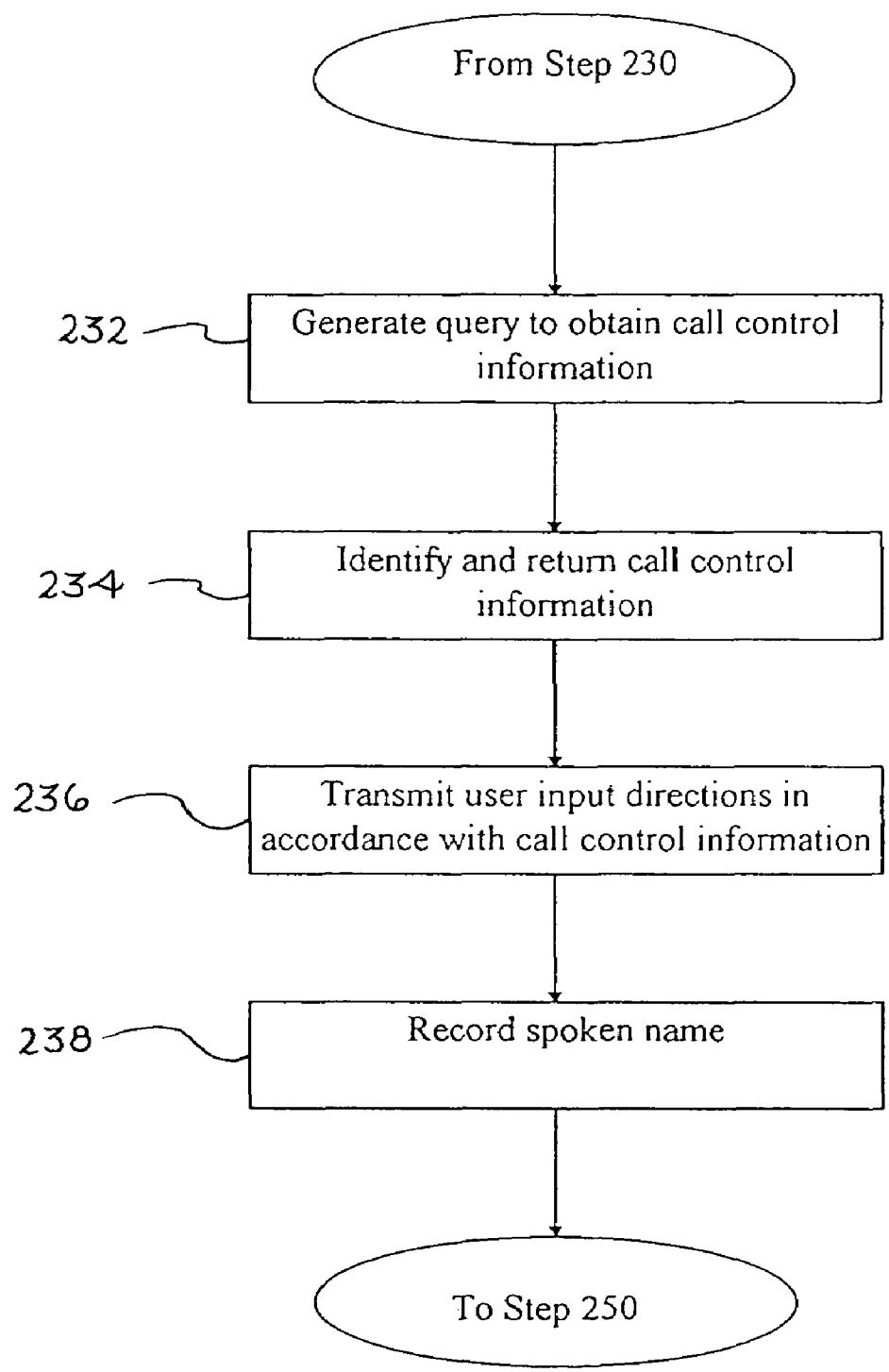
FIG. 7 is a more detailed flow chart of the method depicted in FIG. 4.

In accordance with an alternative embodiment, the step of obtaining information associated with the calling telephone station 142 (step 220, FIG. 4) further comprises the following steps as depicted in FIG. 7. If SN 160 or IP 161 cannot identify and return information associated with the telephone number, SSP 120 generates a query to SCP 150 (step 232, FIG. 7) requesting further call control information. SCP 150 locates and returns call control information to SSP 120 (step 234) that enables the creation of audible caller input directions that direct the calling party at calling telephone station 142 speak his or her name. SSP 120 transmits the caller input directions to calling telephone station 142 (step 236). When the calling party speaks their name, the spoken name is digitized and recorded by SN 160 or IP 161 (step 238). The recorded name can be played back to the customer at called telephone station 122 through the use of the speech processing capabilities of SN 160 or IP 161. SN 160 or IP 161 preferably provides the recorded name to the called telephone station 122 between the call waiting indicators as described herein.

According to an alternative of the above embodiment, when the caller at calling telephone station 142 speaks his or her name, the spoken name can be directly provided to the customer at called telephone station 122 through central office 140 and SSP 120. The name is preferably provided between the call waiting indicators as described herein.

In accordance with a further alternative embodiment, the step of obtaining information associated with the calling telephone station (step 220, FIG. 4) further comprises the following steps. When the user input directions, as described above, are transmitted to calling telephone station 142 (step 236, FIG. 7), additional user input instructions can be transmitted to calling telephone station 142. The additional user input instructions can request the calling party to provide additional information relating to the handling of and/or the content of the information associated with the calling telephone station 142. These directions preferably include requests for information from the calling party regarding the priority of the message to be delivered to called telephone station 122. For example, if the caller believes that the message is urgent, the caller may enter appropriate instructions that enable the SN 160 or IP 161 to generate standard or customized messages that are included in the information associated with calling telephone station 142 that is transmitted to called telephone station 122 (step 270, FIG. 4). The user can, for example, utilize a dual-tone-multi-frequency (DTMF) signal to provide information as known by those skilled in the art. This alternative can be implemented in conjunction with the methods depicted in FIGS. 6 and 7 and described herein.

In accordance with a further alternative embodiment, the step of obtaining information associated with calling telephone station 142 (step 206, FIG. 4) further comprises the following steps. When SSP 120 determines that called telephone station 122 is busy and generates a query to SCP 150 requesting call control information, SCP 150 identifies and returns call control information to SSP 120. The call control information directs SSP 120 to generate instructions that ask the calling party at calling telephone station 142 to speak his or her name. The instructions are sent to a caller at calling telephone station 142 without attempting to locate a name associated with the telephone number in a database. The spoken name can be recorded or delivered as described above.

Figure 8:
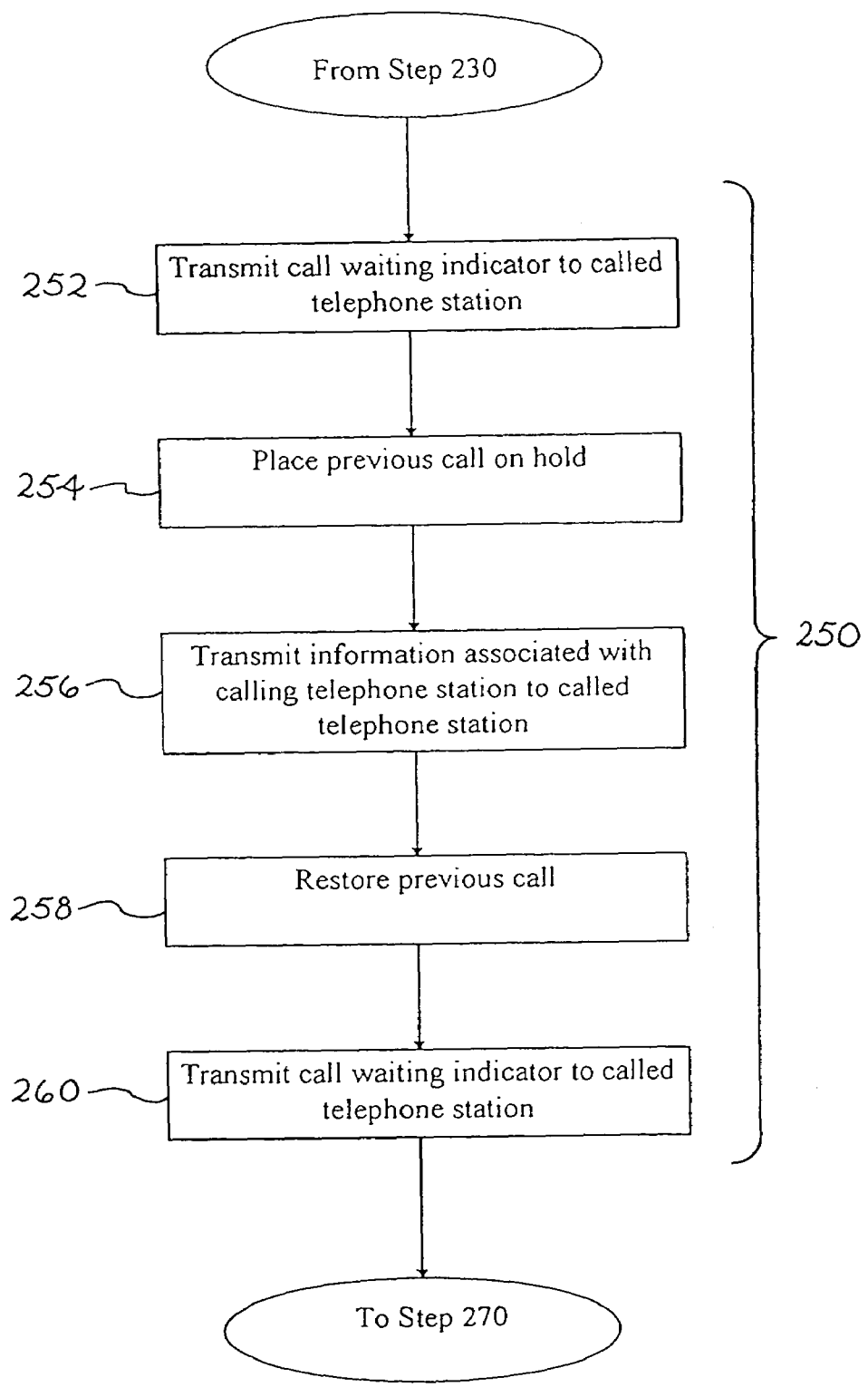
FIG. 8 is a more detailed flow chart of the method depicted in FIG. 4.

According to a preferred embodiment as depicted in FIG. 8, SSP 120 preferably generates the call waiting indicator comprising a tone or other similar indicator that is transmitted to called telephone station 122 to signify the start of the call waiting message (step 252, FIG. 8). The call path of the previous call is temporarily interrupted to temporarily place the previous call on hold (step 254) while the SN 160 or IP 161 automatically transmits an audible representation of the name associated with a caller at calling telephone station 142 to called telephone station 122 (step 256). SN 160 or IP 161 implements the text to speech module 164 to generate an audible representation of the name associated with calling telephone station 142. The audible representation of the name is preferably transmitted to called telephone station 122 within a predetermined amount of time after the call waiting indicator is transmitted. The previous call is restored after the name has been transmitted to called telephone station 122 (step 258). SSP 120 preferably generates a second call waiting indicator comprising a tone or other similar indicator that is sent to called telephone station 122 (step 260). The second call waiting indicator is preferably transmitted to called telephone station 122 within a predetermined amount of time after the name is transmitted. According to an alternative embodiment, the steps of transmitting a call waiting indicator (step 250, FIG. 4, steps 252, 260, FIG. 8) comprise transmitting a plurality of tones to called telephone station 122. According to a further alternative embodiment, the call waiting indicators are generated by SN 160 or IP 161 and transmitted to called telephone station 122.

According to an alternate embodiment, the information associated with calling telephone station 142, described in conjunction with FIGS. 4, 5, 6, 7 and 8 comprises the identity of a caller at calling telephone station 142 and the telephone number associated with calling telephone station 142.

Figure 9:
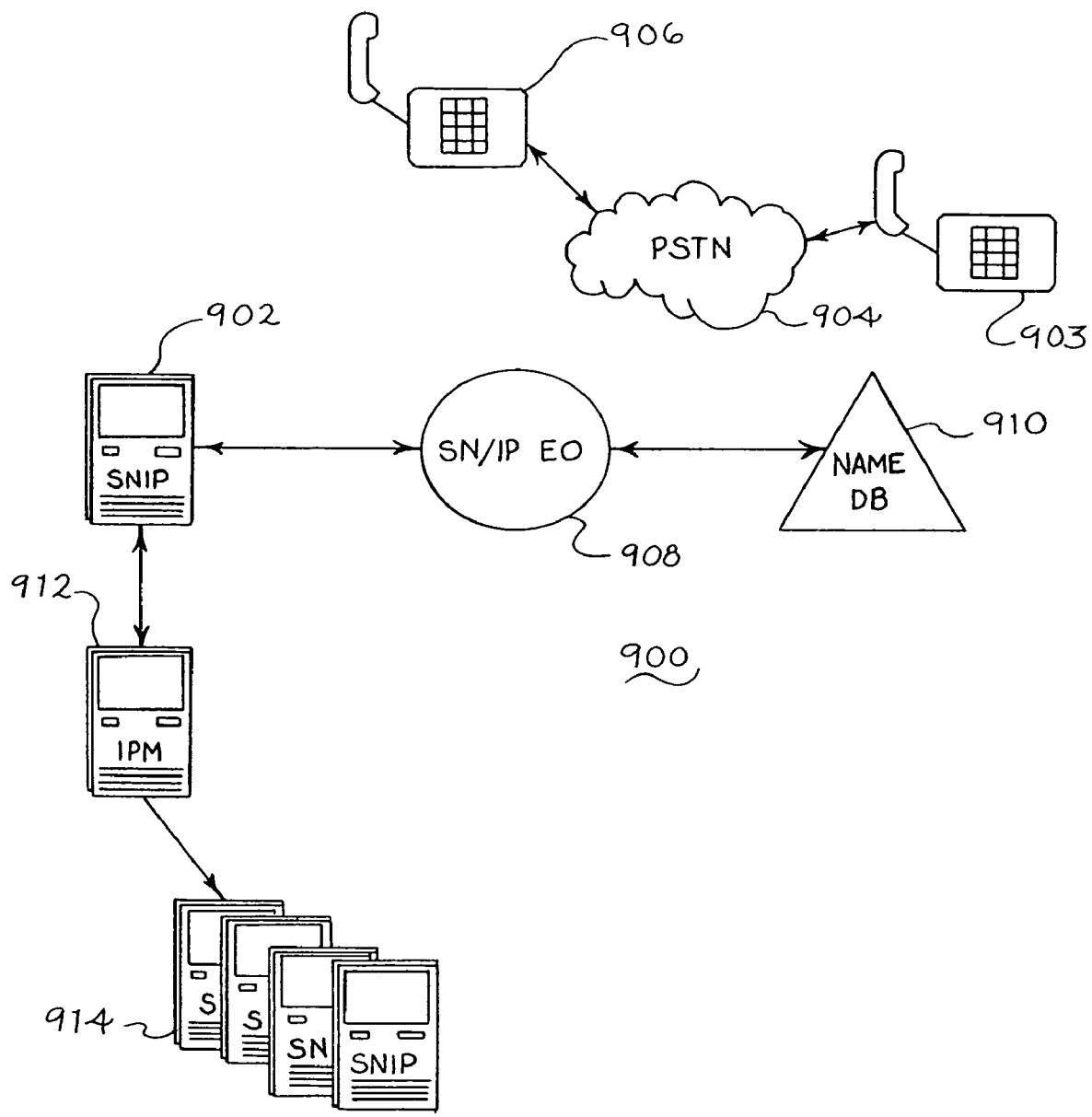
FIG. 9 is a block diagram of the system depicted in FIG. 1.

Referring to FIG. 9, it shows a block diagram of the system depicted in FIG. 1. In FIG. 9, a communication system 900 is configured for verifying caller identification information and providing a name change service. Thus, the system 900 is particularly effective for enabling a user to change or correct or improve the pronunciation of caller identification information, such as the user's name, as presented by the system to a calling party. Such caller identification information may be difficult to render accurately using text to speech (TTS) capability. Some names have nonstandard pronunciations or are susceptible to misinterpretation by the text to speech logic as enforced by parsing rules. Since this misinterpretation of a calling party's name can be embarrassing to the calling party and unhelpful to the called party, such misinterpretation limits the utility of the call waiting system or other caller identification systems.

For verifying audible caller identification information, the communication system 900 includes a compact service node (CSN) 902 coupled with the public switched telephone network (PSTN) 904. A calling telephone station 903 is coupled to the PSTN, along with a called telephone station 906.

The CSN 902 in the embodiment of FIG. 9 is illustrated as a service node or intelligent peripheral (SNIP). The SNIP is one or more elements of the advanced intelligent network (AIN) and includes a SNIP EO 908 and a name database 910. The name database 910 stores information associated with the calling communication station for providing call waiting and other caller identification information to a called party. In one embodiment, the name database 910 stores the telephone number of the calling party and, associated therewith, text which defines the name of the calling party. This stored text may be considered to be a text to speech data input file for providing an audible representation of the caller identification information for the calling telephone party. The SNIP 902 is coupled with an intelligent peripheral manager (IPM) 912 which is also coupled to a plurality of other SNIPs 914. Structure and operation of AIN elements such as CSNs, SNIPs, and IPMs are well known. These components are readily available from various vendors. Performance of the operations described herein, such as storing data and playing audible information to a called party, may be distributed among the components of the AIN network.

It is assumed in the discussion below that a calling party using calling telephone station 903 is aware of an error in the presentation of the calling party's caller identification information. For example, this error may be a mispronunciation of the calling party's name or other caller identification information when the calling party places a current call to the called telephone station 906 which is engaged in a previous call. For verifying and correcting call waiting or other caller identification information in the communication system 900, the calling party at the calling telephone station 903 dials a number associated with the SNIP 902. In response to initiation of the verification call by the calling party at the calling telephone station 903, the SNIP EO 908 generates a calling name query. The telephone number associated with the calling telephone station 903 is transmitted to the name database 910 and, in response, the calling line identification information is conveyed from the name database 910 to the SNIP EO 908. The number for the calling telephone station 903 and the associated calling line identification information are then conveyed to the SNIP 902 and stored temporarily.

In the illustrated embodiment, the name information as stored in the name database 910 and conveyed to the SNIP 902 is in the form of ASCII or other text corresponding to the name associated with the calling telephone station. In other applications, this same data is presented to caller identification equipment to provide an indication of the calling party's identification. When the file is provided to text to speech logic of the SNIP 902, the text to speech logic produces an audible representation of the caller identification information associated with the calling telephone station 903. Text to speech logic and appropriate file formats are well known in the art, and may be implemented using digital signal processing techniques. Preferably, only the calling party's name information, not the telephone number of the calling telephone station, are voiced by the text to speech logic.

After the name information is received at the SNIP 902 from the name database 910, the SNIP 902 plays the name information to the calling telephone station 903. The calling party hears the current pronunciation of the information. If an exception to the standard pronunciation of the caller's name has been recorded, the exception is played. An exception is any variation from the standard pronunciation and may be stored in response to caller input in a manner described below.

Preferably, the SNIP 902 provides a series of menu options to the calling party. By selecting a name change option, the calling party is allowed to record a new pronunciation of the calling party's name. The SNIP 902 detects the new, spoken calling party identification information and records the information to a file. The file is temporarily stored in the SNIP 902 as a pending name file. This file may have any suitable format Subsequently, after successful recording of a new pronunciation, in the illustrated embodiment, a system administrator retrieves the pending name file and converts the file to text to speech data input files. The converted text to speech input files are suitable for activating the text to speech logic to produce the new pronunciation of the calling party's name.

As noted, in the illustrated embodiment, a system administrator retrieves a stored representation of the new pronunciation and converts the stored representation to a text to speech input file. This is performed using IPM 912. Subsequently, the text to speech file is stored at appropriate locations in the communication system. These locations may include the SNIP 902 and all other SNIPs 914 in the system 900.

In a typical embodiment, the AIN components illustrated in FIG. 9 are independent of the AIN components illustrated in FIGS. 2 and 3. A network element such as SNIP 902 is preferably dedicated to providing the name change and verification service for a calling party. A separate network element, such as service node 160 (FIG. 2) provides the audible caller identification information. The two functions may be embodied as service package applications (SPAs) which are independent but work together. The name change or correction is made at the SNIP 902 and subsequently downloaded to the SN 160 for use during presentation of the audible caller identification information.

An example of updating of name change text files is described below. The following steps are executable with AINET permissions.

1. The Name Change voice files will be periodically moved from the SNIP dedicated with the Name Change SPA to the IPM. The administrator will manually convert this to a text file containing:

Action <I,U,D>: 10 digit telephone number:name display text: pronunciation revision For example:

I:3124242078:OH,STEVEN,J:\(steevee \)\!si100 oh.

This will map to the service node as:

| Index | NameMatch | NewName |
|---|---|---|
| 3124242078 | OH,STEVEN, J | \( steevee \) \!si100 oh. |

2. The name change script reads the file and attempts to insert, update, or delete the Name entries. The executable command line shall include:

<program name><SNIP address><filename(s)> where:

<program name> is the TCW name change command
<SNIP address> is a valid address parameter populated by INAC
<filename(s)> is the Service Package Application name Multiple file names can be used for archiving.

3. Error messages and completion messages will be logged on the IPM.
a) Append to IPM log on/<log dir>/<log>mmddyyyy
b) As the script is executed, a log message should echo:
<Program name> executed in SNIP <#> by <process number> at <hour:minute>
Inserted: <index number/NewName>
Updated: <index number/NewName> etc.

<Program name> completed in SNIP <#> by <process number> at <hour:minute> c) Error messages should include error reason.
d) After each successful SNIP update, the script will continue automatically to update the next SNIP.

This embodiment is exemplary only and others may suitably be used. In some embodiments, updating of name change speech input files may be done automatically.

Figure 10:
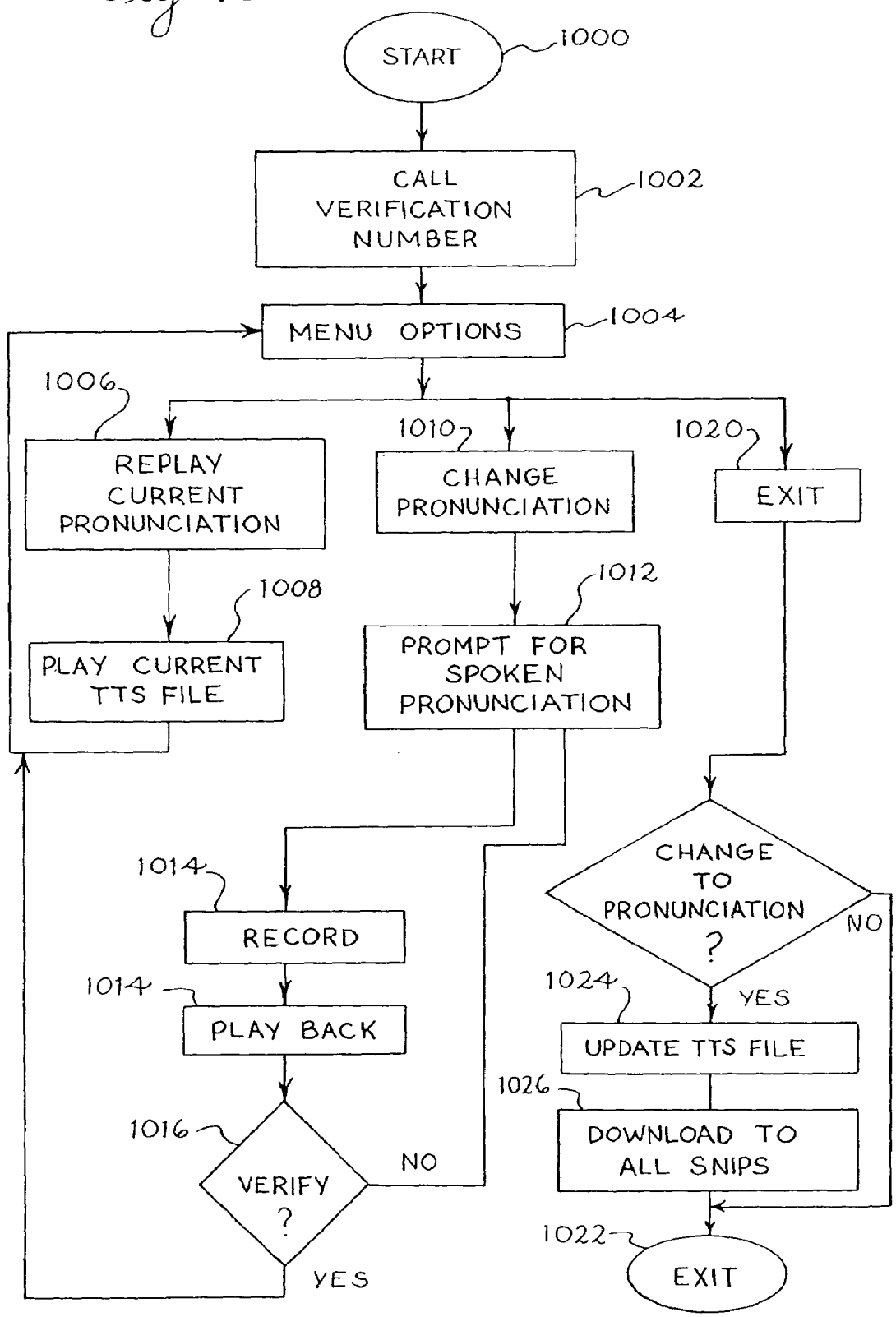
FIG. 10 is a flow chart illustrating a method of verifying or changing call waiting information.

FIG. 10 is a flowchart illustrating a method of verifying or changing an audible caller identification representation in a communication system. The method begins at step 1000. At step 1002, a calling party calls a verification number. For example, the verification number may be a toll free number dialed specifically for the purpose of verifying call waiting or other caller identification information. At step 1004, the calling party is presented with a series of menu options. Preferably, the menu options are audibly presented over a telephone line to the calling party. However, in alternative embodiments, a multimedia system could be provided, for example using the Internet.

According to a first menu option, the calling party may elect to hear a replay of the current pronunciation of the calling party's caller identification representation at step 1006. If this menu option is selected, at step 1008, the communication system plays the current text to speech (TTS) input file containing the current pronunciation of the calling party's name information. Control then returns to step 1004 for further presentation of menu options.

If the calling party selects a menu option to change pronunciation of the calling party's identification information, this process begins at step 1010. This process corresponds to determining exceptions to the current pronunciation based on a new pronunciation of the calling party's name. The exceptions are stored at an exception file. At step 1012, the calling party is prompted by the system for a new spoken pronunciation. As the calling party speaks the new or preferred pronunciation, at step 1014, the new pronunciation, corresponding to the exception, is recorded. At step 1016, this new pronunciation is played back to give the calling party an opportunity to approve. If the calling party approves at step 1016 the new pronunciation is stored in an exceptions file and control returns to step 1004 for presentation of further menu options. If the calling party does not approve or verify the new pronunciation of the calling party's name, control returns to step 1012 where the calling party is again prompted to provide the new spoken pronunciation.

A further menu option includes exiting the system, step 1020. As this step is executed, the system determines if a change has occurred to pronunciation of the calling party's caller identification information. If not, control proceeds to step 1022 and the method terminates. If there was a change to the pronunciation, at step 1024, the TTS input file containing the pronunciation used by the system for providing the audible representation of caller identification information is updated with the new pronunciation. At step 1026, the updated file is downloaded or otherwise conveyed to all suitable locations in the communication system, such as all SNIPs. The method then terminates at step 1022.

From the foregoing, it can be seen that the present invention provides a method and apparatus for verifying and, if necessary, updating the audible caller identification information provided by a communication system for an incoming telephone call. When a calling party questions whether the system is presenting the calling party's name correctly, the calling party can use the illustrated verification service to review the way in which the system plays the name. If the presentation is unsatisfactory, the service allows the caller to modify pronunciation of the name. This enhances the feature so that callers have a way of modifying particularly bad interpretations of the display text stored in the calling name database for their name. The only other way of accommodating complaints without this service is manual updating of text to speech files based on customer complaints.

While a particular embodiment of the present invention has been shown and described, modifications may be made.

For example, while the embodiment of FIGS. 9 and 10 has been described in connection with AIN elements, other equipment such as central office equipment may be used for implementing the techniques disclosed herein. Further, while reference is made to changing and verifying audible call waiting information, any audible caller identification information intended for presentation to a called party may be verified and corrected using the method and apparatus according to the present invention. It is therefore intended in the appended claims to cover such changes and modifications which follow in the true spirit and scope of the invention.

It is therefore intended that the foregoing detailed description be regarded as illustrative rather than limiting, and that it be understood that it is the following claims, including all equivalents, that are intended to define the spirit and scope of this invention.

The invention claimed is:

1. A method for correcting audible caller identification information in a telecommunication system, the method comprising:
    playing to a caller a current text to speech input file for a current pronunciation of the audible caller identification information for the caller;
    in response to a received pronunciation change indication, prompting the caller for a new spoken pronunciation;
    recording the new spoken pronunciation; and
    if verified by the caller, storing a text to speech exception file for the new spoken pronunciation.

2. The method of claim 1 further comprising:
    if a new spoken pronunciation was provided, updating the current text to speech input file with the text to speech exception file.

3. The method of claim 2 further comprising:
    conveying the updated current text to speech input file to all suitable locations in the telecommunication system for use by the system for providing audible caller identification information for subsequent calls.

4. The method of claim 1 further comprising:
    receiving a call placed by the caller to a verification number; and
    providing a series of menu options for correcting the audible caller identification information.

5. The method of claim 4 wherein receiving the call placed by the caller to the verification number comprises:
    receiving a call placed to a toll free number dialed specifically for the purpose of verifying the audible caller identification information.

6. The method of claim 4 wherein providing a series of menu options comprises:
    presenting audible menu options over a telephone line to the caller.

7. The method of claim 4 wherein providing a series of menu options comprises:
    presenting multimedia menu options over the Internet to the caller.

8. A method for correcting audible caller identification information in a telecommunication system, the method comprising:
    at a service node/intelligent peripheral (SNIP) of the telecommunication system, interacting with a caller to correct and verify the audible caller identification information; and
    conveying corrected and verified name change information from the SNIP to at least one service node (SN) of the telecommunication system for use in providing the audible caller identification information during subsequent calls processed by the at least one SN.

9. The method of claim 8 further comprising:
    storing an update name change file at the SNIP;
    moving the update name change file from the SNIP to an Intelligent Peripheral Manager (IPM) associated with an SN of the at least one SN;
    converting the update name change file to a text file specifying the caller's name and number and a pronunciation revision;
    at the SN, reading the text file and updating a stored audible caller identification pronunciation entry.

10. The method of claim 9 further comprising:
    logging error messages and completion messages at the IPM.

11. The method of claim 8 wherein interacting with the caller comprises:
    replaying current pronunciation of the audible caller identification information for verification by the caller;
    if the current pronunciation is not verified by the caller, receiving from the caller a new spoken pronunciation;
    verifying with the caller the new spoken pronunciation; and
    storing a text to speech exception file for the new spoken pronunciation as the corrected and verified name change information.

* * * * *